United States Patent
Shikayama et al.

(10) Patent No.: US 6,628,038 B1
(45) Date of Patent: Sep. 30, 2003

(54) RESOLVER USING SHEET COIL

(75) Inventors: Toru Shikayama, Kitakyushu (JP); Akihiko Maemura, Kitakyushu (JP); Takashi Katsuma, Kitakyushu (JP)

(73) Assignee: Kabushiki Kaisha Yaskawa Kenki, Kitakyushu (JP)

(*) Notice: Subject to any disclaimer, the term of this patent is extended or adjusted under 35 U.S.C. 154(b) by 0 days.

(21) Appl. No.: 09/868,929

(22) PCT Filed: Aug. 23, 1999

(86) PCT No.: PCT/JP99/04542
§ 371 (c)(1),
(2), (4) Date: Jul. 16, 2001

(87) PCT Pub. No.: WO00/42389
PCT Pub. Date: Jul. 20, 2000

(30) Foreign Application Priority Data

Jan. 14, 1999  (JP) .......................................... 11-007907

(51) Int. Cl.⁷ ................................................. H02K 1/22
(52) U.S. Cl. .................................. 310/268; 310/DIG. 6
(58) Field of Search ........................... 310/268, DIG. 6, 310/179–208; 336/200, 323, 223; 318/661, 605, 660

(56) References Cited

U.S. PATENT DOCUMENTS

| | | | | |
|---|---|---|---|---|
| 4,223,300 A | * | 9/1980 | Wiklund | 340/870.31 |
| 4,668,884 A | * | 5/1987 | Amao et al. | 310/68 R |
| 4,949,002 A | * | 8/1990 | Ibe et al. | 310/268 |
| 5,229,696 A | * | 7/1993 | Golker et al. | 318/561 |
| 5,349,259 A | * | 9/1994 | Kaneko et al. | 310/261 |
| 5,644,183 A | * | 7/1997 | Van Loenen et al. | 310/268 |

FOREIGN PATENT DOCUMENTS

| JP | 61-169715 | 7/1986 |
|---|---|---|
| JP | 8-84449 | 3/1996 |
| JP | 8-136211 | 5/1996 |
| JP | 8-292066 | 11/1996 |
| JP | 8-306562 | 11/1996 |

* cited by examiner

Primary Examiner—Dang Le
(74) Attorney, Agent, or Firm—Armstrong, Westerman & Hattori, LLP (57) ABSTRACT

A disklike rotor is placed with air gaps between disklike stators. The disklike rotor has a sheet coil attached to its sides, on which are formed the secondary coil pattern of a rotary transformer and a resolver excitation phase pattern. A sheet coil having the secondary coil pattern of the rotary transformer is attached to the stator opposed to the secondary coil pattern on the rotor, while a sheet coil having a resolver detection phase pattern is attached to the stator opposed to the resolver excitation phase pattern on the rotor. This resolver using a sheet coil is inexpensive and small-sized, decreases angular errors, and avoids the decrease in detection voltage. The variation in amplitude of flux linkage can be limited if there is misalignment of a sheet coil.

8 Claims, 8 Drawing Sheets

| 1 | Shaft | 5 | Stator side sheet coil |
|---|---|---|---|
| 2 | Stator | 51 | Disk |
| 21 | Back yoke | 52 | Disk |
| 3 | Stator | 6 | Rotary sheet coil |
| 31 | Back yoke | 61 | Disk |
| 4 | Rotor | 62 | Disk |
| 41 | Back yoke | | |

Fig. 1

| 1  | Shaft     | 5  | Stator side sheet coil |
| 2  | Stator    | 51 | Disk |
| 21 | Back yoke | 52 | Disk |
| 3  | Stator    | 6  | Rotary sheet coil |
| 31 | Back yoke | 61 | Disk |
| 4  | Rotor     | 62 | Disk |
| 41 | Back yoke |    | |

Fig.2

| 5  | Stator side sheet coil | 55 | Rotary transformer primary side pattern |
| 50 | Throughhole | 56 | Resolver detection phase pattern (α phase) |
| 51 | Disk | 57 | Resolver detection phase pattern (β phase) |
| 52 | Disk | 58 | Terminal |
| 53 | Linear portion | 59 | Throughhole |
| 54 | Projection | | |

Fig. 3

| 6 | Rotor side sheet coil | 64 | Rotary transformer secondary side pattern |
| 61 | Disk | 65 | Resolver excitation phase pattern |
| 62 | Disk | 66 | Throughhole |
| 63 | Linear portion | 67 | Throughhole |

(b) Throughhole 67

RESOLVER USING SHEET COIL

BACKGROUND OF THE INVENTION

1. Field of the Invention

The present invention relates to a small-sized and thin type resolver using a sheet coil, which is used for detection of speed and position of a servomotor in the field of, for example, factory automation equipment and office automation apparatuses, and is composed of a sheet coil.

2. Description of the Related Art

A prior art with resolver using a sheet coil is such that a flat sheet coil of an excitation phase consisting of one phase and a flat sheet coil of a detection phase consisting of two phases are disposed with air gaps, wherein the detection phase has a detection phase of eddy current patterns made of copper foil and formed on the surface side and rear side thereof, between which a thin film insulation sheet layer is placed, and another detection phase having a phase difference of an electric angle of 90° with respect to the above-described detection phase, although it is the same pattern, between which the thin insulation sheet layer is placed. On the other hand, the excitation phase is such that the same eddy-like pattern is disposed without any difference in phase on the surface side and rear side thereof, between which a thin-film insulation sheet layer is placed. The resolver using a sheet coil is such that the flux linkage of the detection changes according to a sine wave by a rotation angle at high precision on the basis of an eddy pattern that is accurately patterned by etching, etc., and the angular error is reduced to be small (For example, JP, 8-84449, A).

Also, the following rotary transformer is disclosed as that having the same functions as those of the resolver using a sheet coil. In the rotary transformer, a pair of secondary side conductor patterns formed on the surface side and rear side of a thin-film substrate made of an insulation body are formed of multi-layered thin-film conductors concentrically with clearance secured at a part of a circle, and the ends between the thin-film conductors are connected to each other by a jumper line, wherein the second side is opposed to and disposed at the primary side of the transformer through a throughhole and clearance (For example, JP, 8-306562, A).

Also, in other prior art with resolvers having a sheet coil, there is a resolver in which a patter of a rotary transformer is provided inside the resolver pattern, and the pattern of the rotary transformer and that of the resolver are made integral with each other (For example, JP, 8-136211, A).

However, the following problems and shortcomings exist in the prior art. (1) Because a resolver using a rotary transformer according to JP, 8-136211 is such that the pattern of a rotary transformer is made integral with that of a resolver, the number of working processes can be reduced, and production cost thereof can be decreased. But, the outer diameter must be reduced when making the resolver smaller, the pattern of the rotary transformer is made very small, wherein a lowering in the transformation ratio occurs due to a decrease in a magnetic flux and number of windings, and an appointed detection voltage could not be obtained. Also, because the detection phase pattern links with a magnetic flux produced by the rotary transformer, large residual voltage is generated to cause an angular error to be increased. (2) In the resolver described in JP, 8-84449 and rotary transformer described in JP, 8-306562 the primary side center is misaligned with the secondary side center due to misalignment when attaching a sheet coil of a conductor, and as the sheet coil rotates, a fluctuation component in the mechanical angle of 360° appeared in the amplitude of flux linkage. As described above, in the prior art, there is a problem in that only slight misalignment in attaching a sheet coil causes a large angular error. Also, although the angular error can be decreased if the precision of attaching a sheet coil and of incorporation thereof is improved, the cost is increased instead, wherein an original effect of becoming less expensive may be lost. It is therefore an object of the invention to provide an inexpensive resolver using a sheet coil, having only a small angular error, which can be downsized without resulting in a lowering of the detection voltage and can limit the variation in amplitude of flux linkage even if misalignment occurs when attaching a sheet coil.

SUMMARY OF THE INVENTION

The present invention is a means to solve the above-described problems and shortcomings, and a resolver using a sheet coil according to a first embodiment of the present invention is disclosed below.

That is, a resolver according to the present invention is provided with a disk-shaped rotor and two disk-shaped stators between which the rotor is placed with air gaps in the axial direction thereof, wherein the above-described rotor is such that a rotor side sheet coil is attached to both sides of a disk-shaped soft magnetic material on which are formed a secondary side pattern of a rotary transformer and a resolver excitation phase pattern, and a stator side sheet coil having a rotary transformer primary side pattern formed on a disk-shaped soft magnetic material is attached to one of the stators opposed to the above-described rotary transformer secondary pattern, and a stator side sheet coil having a resolver detection phase pattern formed on a disk-shaped soft magnetic material is attached to the other of the above-described stators opposed to the above-described resolver excitation phase pattern.

Also, the above-described rotor side sheet coil according to the present invention is formed of a single sheet composed of a disk having the above-described resolver excitation phase pattern formed, a disk having the above-described rotary transformer secondary side pattern formed, and a linear portion having a cross-over line that connects the above-described resolver excitation phase pattern and the above-described rotary transformer secondary side pattern to each other.

In addition, the above-described stator side sheet coil is formed of a single sheet composed of a disk having the above-described resolver detection phase pattern formed, a disk having the above-described rotary transformer primary side pattern formed, and a linear portion that links the corresponding two disks with each other.

Further, the above-described rotary transformer secondary side pattern formed on both sides of the disk according to the invention is a pattern eddying from outside to inside, and both the patterns are connected to each other in series, and the above-described resolver excitation phase pattern that is formed at both sides of the disk is a pattern eddying by 2N times in the circumferential direction where N is a natural number, and the center of the eddy on the surface side is disposed at the same position of the eddy on the rear side in the circumferential direction, and 4N eddies are connected to each other in series, wherein the axial multiple angle is NX.

Also, the above-described rotary transformer primary side pattern is formed on both sides of the disk, and both patterns eddying from outside to inside are connected to each other in series, and the above-described resolver detection phase pattern is formed on both sides of the disk, and one side of which is a "α" phase and the other of which is a "β" phase, wherein 2N patterns eddying in the circumferential direction are disposed, and the center positions of the eddies of the "α" phase and "β" phase slip by 90/N° from each other in the circumferential direction. Also, 2N eddies are connected to each other in series, wherein the axial angle becomes NX.

Therefore, in the present invention, because the area of the rotary transformer can be increased further than that of the prior art rotary transformers even if the outer diameter thereof is reduced, the detection voltage is lowered beyond that in the prior art. Also, because the patterns of the rotary transformer are not on the same level as that of the resolver patterns, no flux produced by the rotary transformer links with the detection phase patterns of the resolver, whereby a problem of the residual voltage can be solved, and it is possible to provide a resolver using a sheet coil, the angular error of which is further suppressed to be small. In addition, power consumption can be remarkably decreased, whereby it is very advantageous in an operation backed up by a battery in case of an electric failure.

Next, a resolver using a sheet coil according to a second preferred embodiment of the invention is disclosed below.

That is, in the present invention, one of either the outer diameter of the above-described rotary transformer secondary side pattern and that of the above-described rotary transformer primary side pattern is made larger than the other thereof.

Also, in the present invention, the radius $r_2$ of the extremely outer conductor of the above-described rotary transformer secondary side pattern and radius $r_1$ of the extremely outer conductor of the above-described rotary transformer primary side pattern is established so as $0<r_2-r_1 \leq 4 \times \lambda_2$ or $0<r_1-r_2 \leq 4 \times \lambda_1$ wherein the pattern pitch of the rotary transformer secondary side pattern is $\lambda_2$ and the pattern pitch of the rotary transformer primary side pattern is $\lambda_1$.

Next, a resolver using a sheet coil according to a third preferred embodiment of the present invention is disclosed below.

That is, in the present invention, the outer diameter of the above-described resolver excitation phase pattern is made larger than the outer diameter of the resolver detection phase pattern while the inner diameter of the resolver excitation phase pattern is made smaller than the inner diameter of the resolver detection phase pattern, or the outer diameter of the above-described detection phase pattern is made larger than the outer diameter of the above-described excitation phase pattern while the inner diameter of the detection phase pattern is made smaller than the inner diameter of the excitation phase pattern.

Also, in the present invention, where the pattern pitch of the resolver excitation phase pattern is $\lambda_\theta$, and the pattern pitch of the resolver detection phase pattern is $\lambda_\alpha$, the radius $r_{\theta 0}$ of the extremely outer conductor of the resolver excitation phase pattern and the radius $r_{\alpha 0}$ of the extremely outer conductor of the rotary transformer primary side pattern, or the radius $r_{\theta 1}$ of the extremely inner conductor of the resolver excitation phase pattern and the radius $r_{\alpha i}$ of the extremely inner conductor of the rotary transformer primary side pattern are established so as to become $0<r_{\alpha o}-r_{\theta o} \leq 4 \times \lambda_\alpha$ and $0<r_{\theta i}-r_{\alpha i} \leq 4 \times \lambda_\alpha$ or $0<r_{\theta o}-r_{\alpha o} \leq 4 \times \lambda_\theta$ and $0<r_{\alpha i}-r_{\theta i} \leq 4 \times \lambda_\theta$.

Therefore, with the present invention, it is possible to limit the variation in amplitude of flux linkage even if misalignment occurs when attaching sheet coils, wherein the angular error can be minimized. In addition, because there is no need to remarkably increase the assembling accuracy, it is possible to provide an inexpensive resolver.

DETAILED DESCRIPTION OF PREFERRED EMBODIMENTS

Hereinafter, a description is given of the preferred embodiments of the invention.

Embodiment 1

Figure 1:
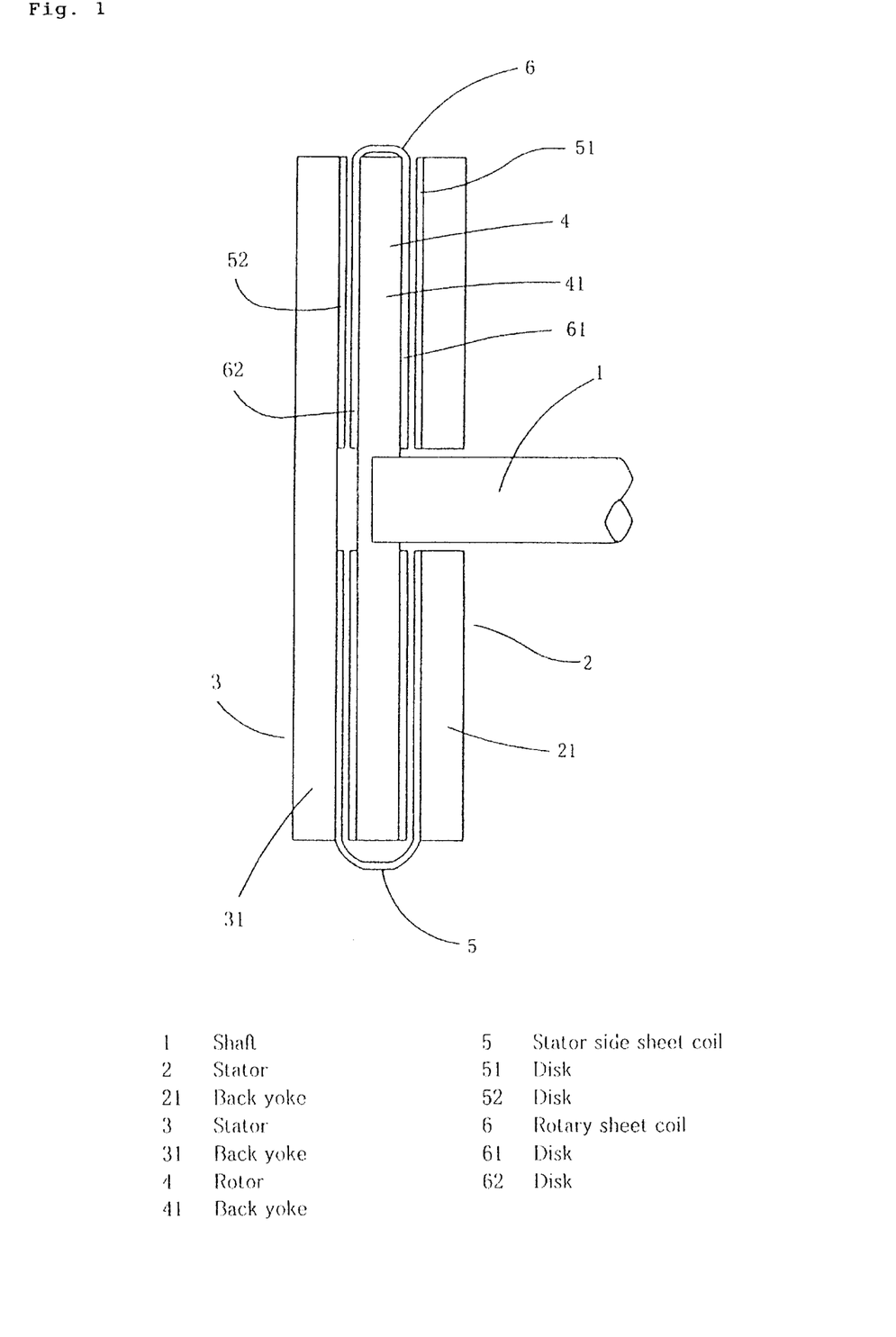
FIG. 1 is a sectional view of a resolver using a sheet coil according to the first embodiment of the present invention.

FIG. 1 is a sectional view of a resolver using a sheet coil according to the first embodiment of the present invention.

Figure 2:
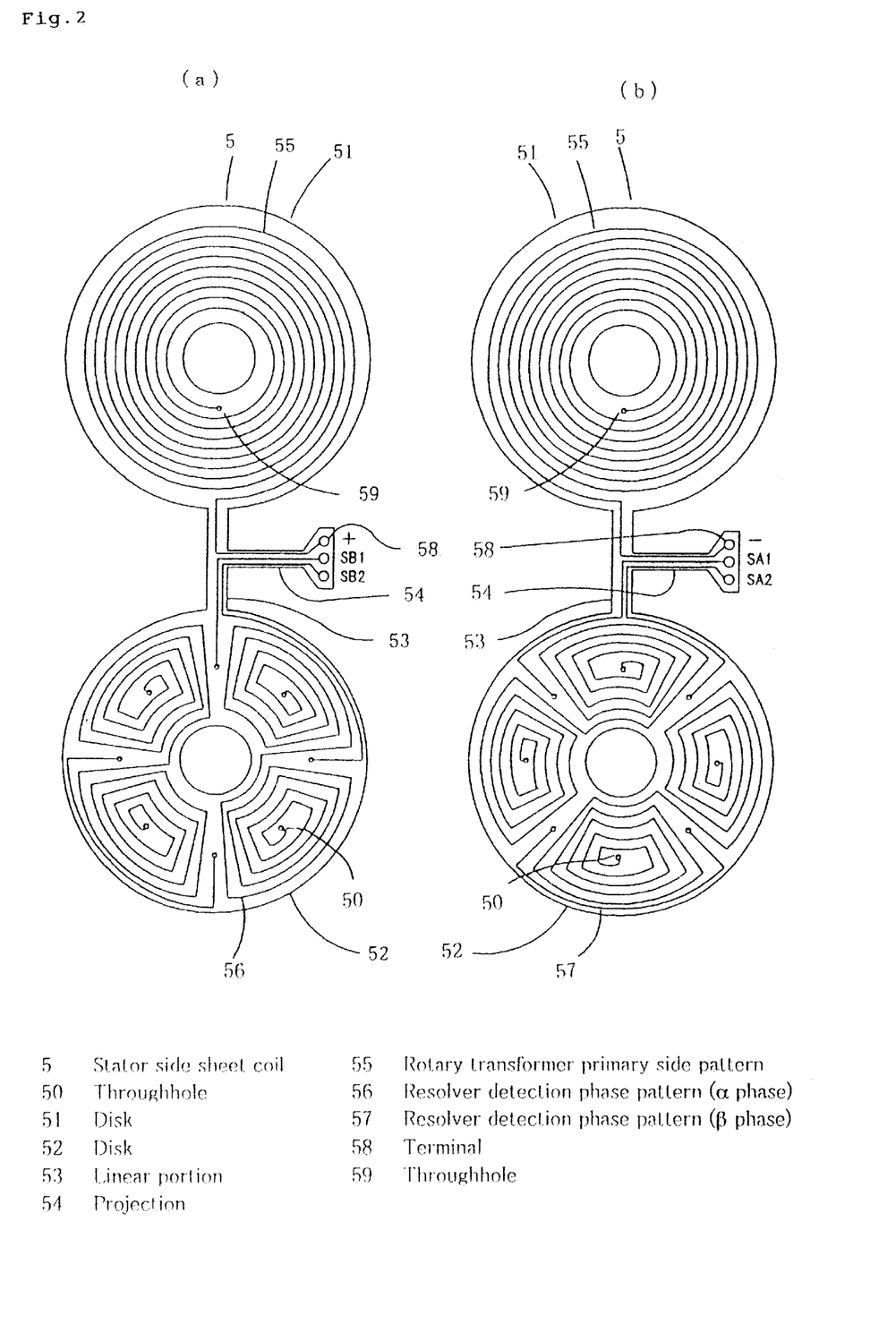
FIG. 2 shows a plan view of a pattern of a stator side sheet coil, wherein (a) shows the pattern on the surface side thereof, and (b) shows the pattern on the rear side when seeing it through the front side of (a)
Figure 3:
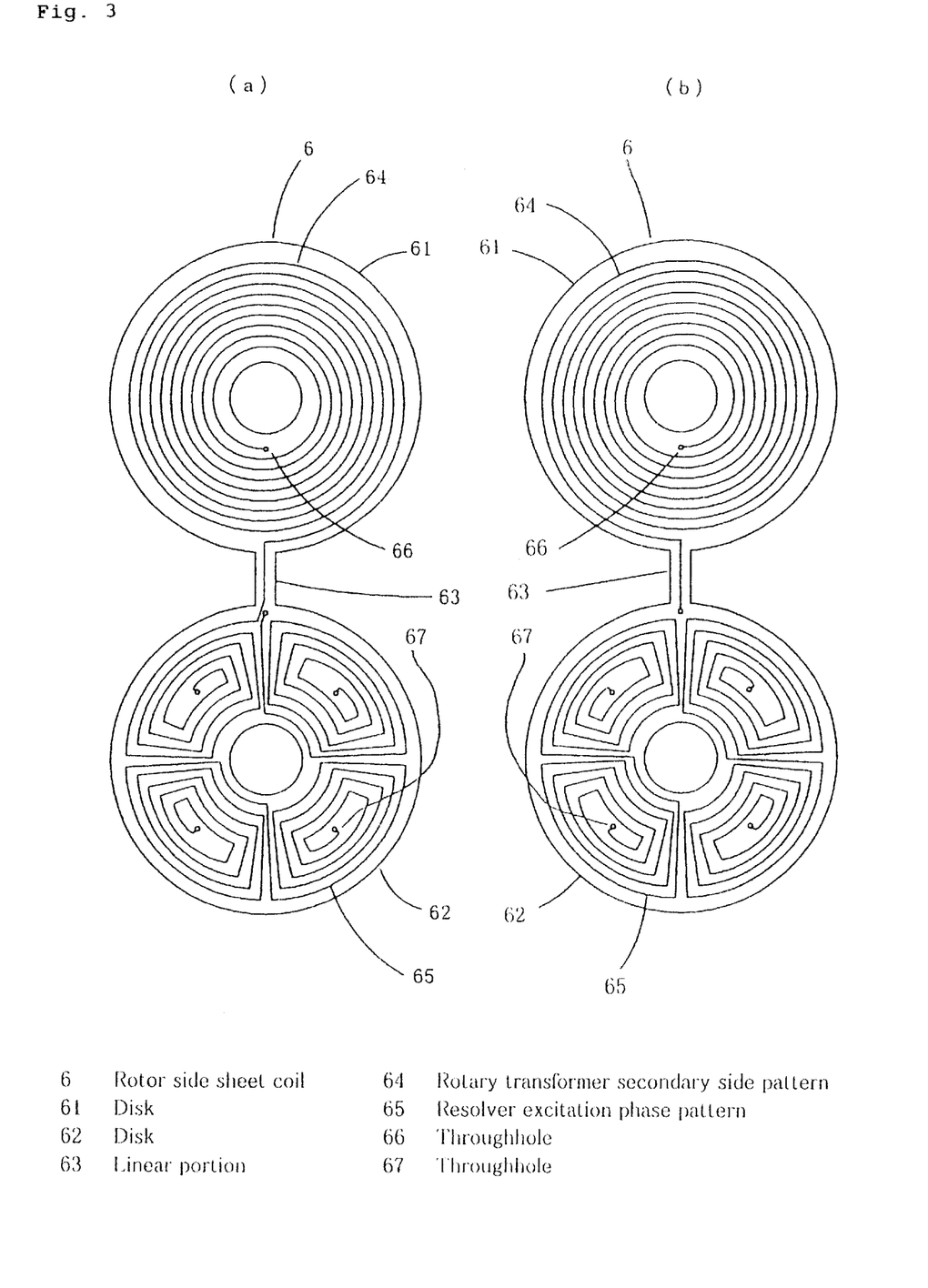
FIG. 3 shows a plan view showing a pattern of a rotor side sheet coil, wherein (a) shows the pattern on the surface side thereof, and (b) shows the pattern on the rear side when seeing it through the front side of (a)

FIG. 2 shows a plan view of a pattern of a stator side sheet coil, wherein (a) shows the pattern on the surface side thereof, and (b) shows the pattern on the rear side when seeing it through the front side of (a); and FIG. 3 shows a plan view showing a pattern of a rotor side sheet coil, wherein (a) shows the pattern on the surface side thereof, and (b) shows the pattern on the rear side when seeing it through the front side. In these drawings, a resolver, the axial multiple angle of which is 2× and which is one-phase excitation two-phase output type, is shown as an example. 2× means a resolver having a pole logarithm of 2, wherein "X" is usually added where it is expressed in terms of axial multiple angle.

A description is given of characteristics of a resolver using a sheet coil according to the present invention.

In FIG. 1, the resolver is composed of a rotor 4 and two stators 2 and 3 secured at both sides in the axial direction of the rotor 4. The rotor 4 has disks 61 and 62 of the rotor side sheet coil 6, which are attached to both sides of a back yoke 41 made of thin disk-shaped ferrite. The rotor side sheet coil 6 uses a copper foil as a conductor, and a coil pattern is formed on both sides of a thin film insulation sheet layer. Also, a shaft 1 is vertically secured and fixed by adhering at the center of one side of a back yoke 41 of the rotor 4, and a hole is provided at the center of a back yoke 21 that constitutes the stator 2, through which the shaft is passed.

First, a description is given of a stator side sheet coil with reference to FIG. 2.

The stator side sheet coil 5 is composed of two disks 51 and 52, a linear portion 53 that connects them to each other, and a projection 54 extending from one side in the vicinity of the middle of the linear portion 53 to sideways, and a rotary transformer primary side pattern 55 and resolver detection phase patterns 56 and 57 are, respectively, formed at each of the disks 51 and 52. The resolver detection phase patterns 56 and 57 have, respectively, an "α" phase 56 on their surface side, and a "β" phase 57 on their rear side.

The rotary transformer primary side pattern 55 eddy patterns from the vicinity of the center of the disk 51 to the outside, and the pattern 55 has two terminals (positive and negative) 58 on both sides of the projection 54. (Positive) on the surface side of the terminal 58 and (Negative) on the rear side thereof are, respectively, connected to the outside of the surface eddy pattern and the outside of the rear side eddy pattern. Further, they are connected to each other by a throughhole 59 in the vicinity of the center. The surface and rear patterns eddy in the same direction when being observed from the same surface side, thereby constituting a single coil.

Four eddy patterns are formed on the resolver detection phase patterns 56 and 57 in the circumferential direction, and slip by half a pitch in the circumferential direction from each other. Therefore, they slip by 90 degrees in terms of electric angle and by 45 degrees in terms of mechanical angle.

Two terminals (SA1 and SA2) 58 of the resolver detection phase pattern 56 ("α" phase) are provided on the rear side of the projection 54, and they are connected to the centers of the eddy patterns on the surface side through the throughholes 50 between the eddy coil patterns on the rear side. The outside of the eddy pattern is linked to the outside of the eddy adjacent thereto by a crossover line, and the centers thereof are linked to each other on the rear side through the throughholes 50.

Two terminals (SB1 and SB2) 58 of the resolver detection phase pattern ("β" phase) 57 are provided on the surface side of the projection 54, wherein the two terminals are connected to the centers of the eddy patterns on the rear side through the throughholes 50 between the eddy coil patterns on the surface side. The outside of the eddy pattern is linked to the outside of the eddy pattern adjacent thereto by a crossover line, and the centers thereof are linked to each other on the surface side through the throughholes 50.

Next, a description is given of the rotor side sheet coil with reference to FIG. 3.

The rotor side sheet coil 6 is composed of two disks 61 and 62 and a linear portion 63 that connects the two disks to each other. A rotary transformer secondary side pattern 64 and a resolver excitation side pattern 65 are, respectively, provided on the disks 61 and 62. Four eddy patterns are formed on both sides of the resolver excitation phase pattern 65 in the circumferential direction. The circumferential positions on both sides are made the same. These patterns are all connected in series, and are composed as described below. A crossover line is formed on both sides of the linear portion 63, which links the rotary transformer secondary side pattern 64 and resolver excitation phase pattern 65 with each other, wherein they are connected to the outside of the eddy patterns formed on both sides of the rotary transformer secondary side pattern 64, and they are connected to each other inside the eddy patterns through a throughhole 66. The crossover line on the surface side of the linear portion 63 is linked with the outside of one eddy pattern located on the surface side of the resolver excitation phase pattern 65, and is linked with the center of the rear side eddy pattern through the throughhole 67 at the center. The outside of the rear side eddy pattern is linked with the outside of the eddy pattern adjacent thereto. In addition, it is linked with the surface side eddy pattern through the throughhole 67 at the center of the eddy pattern. The same connection is repeated, and finally it is connected to the rear side crossover line of the linear portion 63.

The stator side sheet coil 5 and rotor side sheet coil 6, which are formed as described above, fold up at the linear portions 53 and 63, and are attached to the back yokes 21 and 31 of the stators 2 and 3 and to the back yoke 41 of the rotor. The patterns are disposed so that the rotary transformer primary side pattern 55 of the stator side sheet coil 5 is opposed to the rotary transformer secondary side pattern 64 of the rotor side sheet coil 6, and the resolver detection phase patterns 56 and 57 of the stator side sheet coil 5 are opposed to the resolver excitation side pattern 65 of the rotor side sheet coil 6.

Next, a description is given of the actions.

In the resolver using sheet coils, which is constructed as described above, by applying a high frequency voltage from the terminals 58 (positive and negative) of the rotary transformer primary side pattern 55 at the stator side, voltage is induced at the rotary transformer secondary side pattern 64 at the rotor side. With the voltage, an electric current flows to the resolver excitation phase pattern 65, thereby producing a flux distribution having ridges and valleys in the circumferential direction. When the flux is linked with the stator side resolver detection phase patterns 56 and 57, it is possible to obtain a detect ion volt age whose amplitude changes in response to the rotary angle. Also, because the resolver detection phase pattern 56 of "α" phase and the resolver detection phase pattern 57 of "β" phase are disposed with a phase error of 90 degrees in terms of electric angle, the amplitude of the detection voltage changes with a phase error of 90 degrees in terms of electric angle, wherein the resolver functions as a one-phase excitation and two-phase output resolver.

The first embodiment constitutes a resolver provided with a rotor including a rotary transformer secondary side pattern and a resolver excitation phase pattern on both sides, and stators including a rotary transformer primary side pattern and a resolver detection phase pattern with air gaps on both sides in the axial direction of the rotor. Therefore, if compared with a type in which a prior art rotary transformer pattern is employed inside the resolver pattern, the rotary transformer pattern according to the present invention has an area larger by four times than that of the prior art rotary transformer pattern where it is assumed that they have the same outer diameter. As a result, the number of times of turns becomes larger by eight times at both the primary side and secondary side, and the flux with which the secondary side of the rotary transformer is linked is remarkably increased by an increase in permeance. That is, in a case where an appointed detection voltage is obtained, the present embodiment further decreases the power consumption in comparison with the prior art. In addition, because the rotary transformer pattern and resolver detection phase pattern are not on the same surface, differing from the prior art, the flux that is produced by the rotary transformer is not linked with the resolver detection phase pattern. That is, the problem of a residual voltage, that has occurred in the prior art, can be solved, and it is possible to obtain a highly accurate resolver using sheet coils.

Embodiment 2

Next, a description is given of the second embodiment of the present invention.

Figure 4:
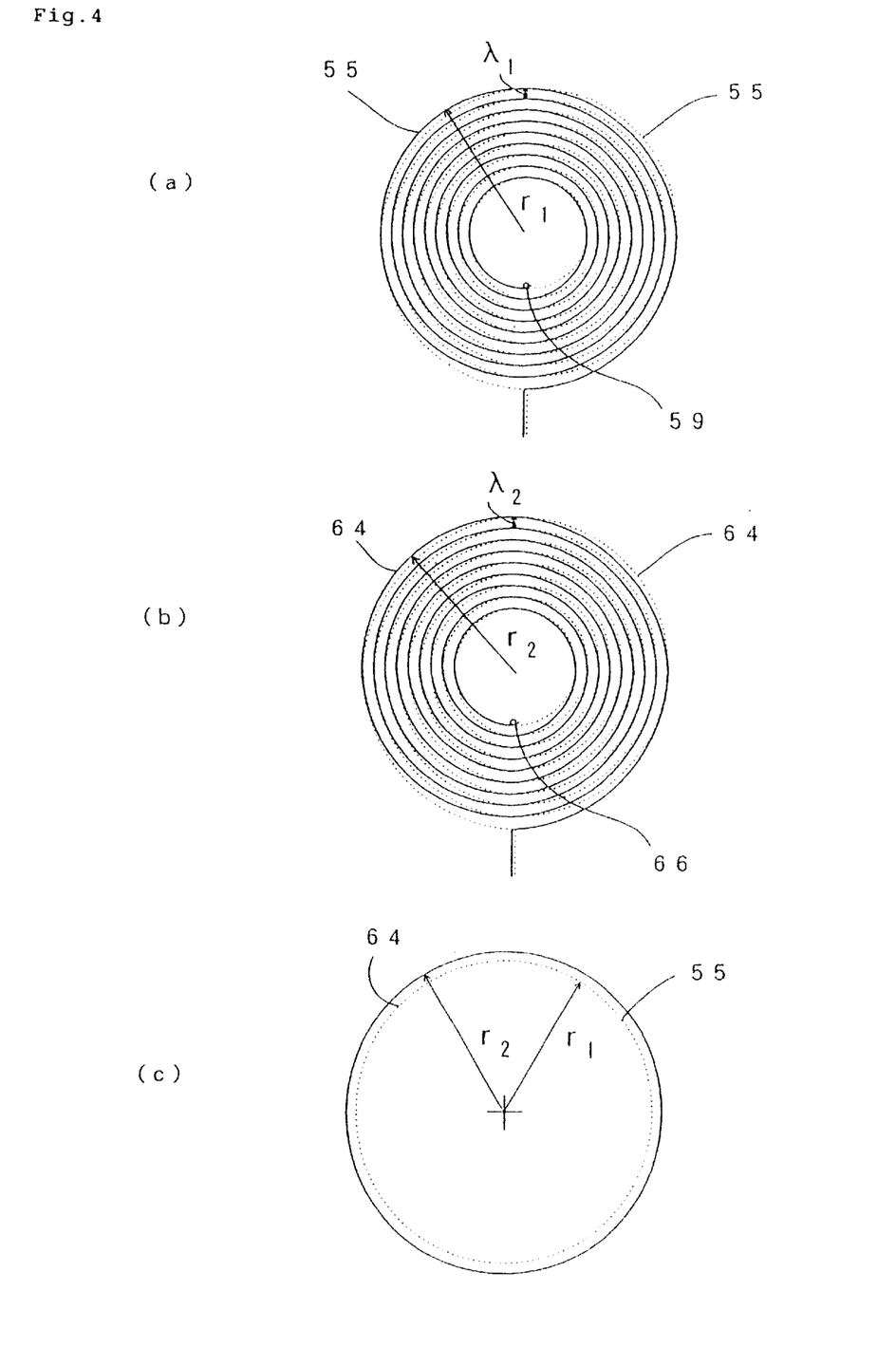
FIG. 4 shows patterns of a resolver using a sheet coil according to the second embodiment of the present invention, which are, respectively, observed in the same direction, wherein (a) is the primary side pattern of a rotary transformer, (b) is the secondary side pattern thereof, and in the drawings, solid lines indicate the pattern of the surface side of sheet coil while dotted lines indicate the rear side pattern that is seen through the surface side, and (c) illustrates the profile of the extremely outer circumferences of the respective patterns when the primary side of the rotary transformer is opposed to the secondary side.

FIG. 4 shows patterns of a resolver using a sheet coil according to the second embodiment of the present invention, which are, respectively, observed in the same direction, wherein (a) is the primary side pattern of a rotary transformer, (b) is the secondary side pattern thereof, and in the drawings, solid lines indicate the pattern of the surface side sheet coil while dotted lines indicate the rear side pattern that is seen through the surface side, and (c) illustrates the profile of the extremely outer circumferences of the respective patterns when the primary side of the rotary transformer is opposed to the secondary side.

In these drawings, the second embodiment differs from the first embodiment in that the radius $r_2$ of the extremely outer conductor of the secondary side pattern is larger than the radius $r_1$ of the extremely outer conductor of the primary side pattern. The difference between the radius $r_2$ and $r_1$ is established to be $0<r_2-r_1 \leq 4\times\lambda_2$ where the pattern pitch of the secondary side pattern is $\lambda_2$.

Also, the reason why this condition is established is that if $4\times\lambda_2$ is 0.2 mm at minimum since the amount of error occurring when attaching the sheet coils is ±0.2 mm or less even if the ease of assembling is taken into consideration, and the pattern pitch is 0.05 mm at minimum, the $r_2-r_1$ is 0.2 mm. Therefore, even if the amount of error is ±0.2 mm, the primary side pattern does not come out of the secondary side pattern.

Next, a description is given of the actions.

Figure 5:
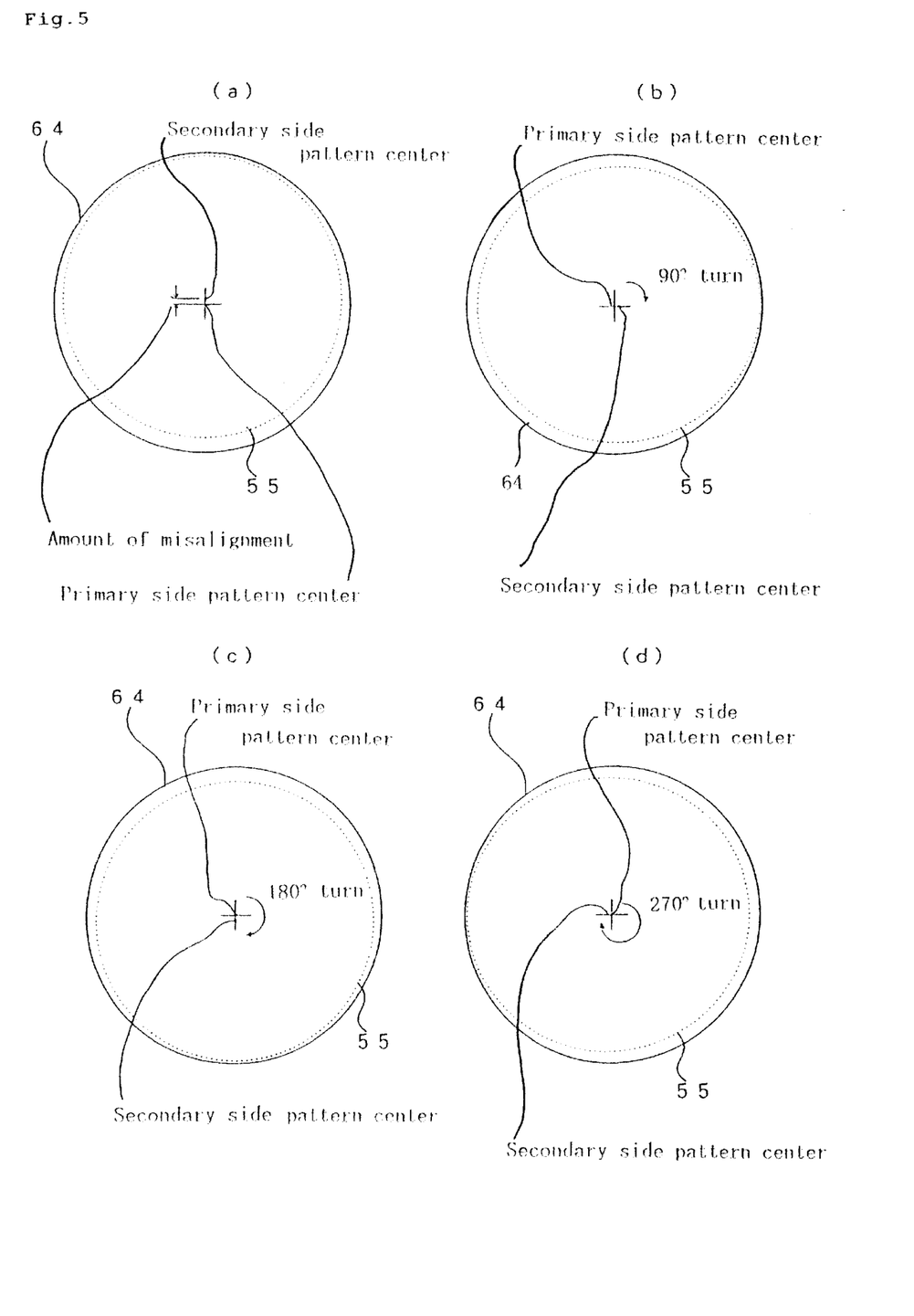
FIG. 5 is a view showing the rotary transformer primary side pattern and the profile of the extremely outer circumferences of the primary side pattern when the rotor misaligns with respect to the center of the stator, wherein (a) shows a case where the rotor stands still, (b) shows a case where the rotor turns by 90 degrees, (c) shows a case where the rotor turns by 180 degrees, and (d) shows a case where the rotor turns by 270 degrees.

FIG. 5 is a view showing the rotary transformer primary side pattern and the profile of the extremely outer circumferences of the secondary side pattern when the rotor misaligns with respect to the center of the stator, wherein (a) shows a case where the rotor stands still, (b) shows a case where the rotor turns by 90 degrees, (c) shows a case where the rotor turns by 180 degrees, and (d) shows a case where the rotor turns by 270 degrees. In a resolver using a sheet coil as described above, if the misalignment occurs when attaching a sheet coil, the rotor side sheet coil is subjected to axial misalignment with respect to the stator side sheet coil, and the rotary transformer secondary side pattern 64 turns on the rotary transformer primary side pattern 55 as shown in FIG. 5 (a) through (d). The extremely outer diameter of the primary side pattern 55 enters the extremely outer diameter of the secondary side pattern 64, wherein the variation in amplitude of flux linkage is decreased.

Because the second embodiment according to the present invention is constructed as described above, even if axial misalignment occurs when attaching a sheet coil, or the rotor is subjected to axial misalignment or a center slip, the variation in amplitude of the flux linkage is limited, and no angular error is increased.

Embodiment 3

Next, a description is given of the third embodiment.

Figure 6:
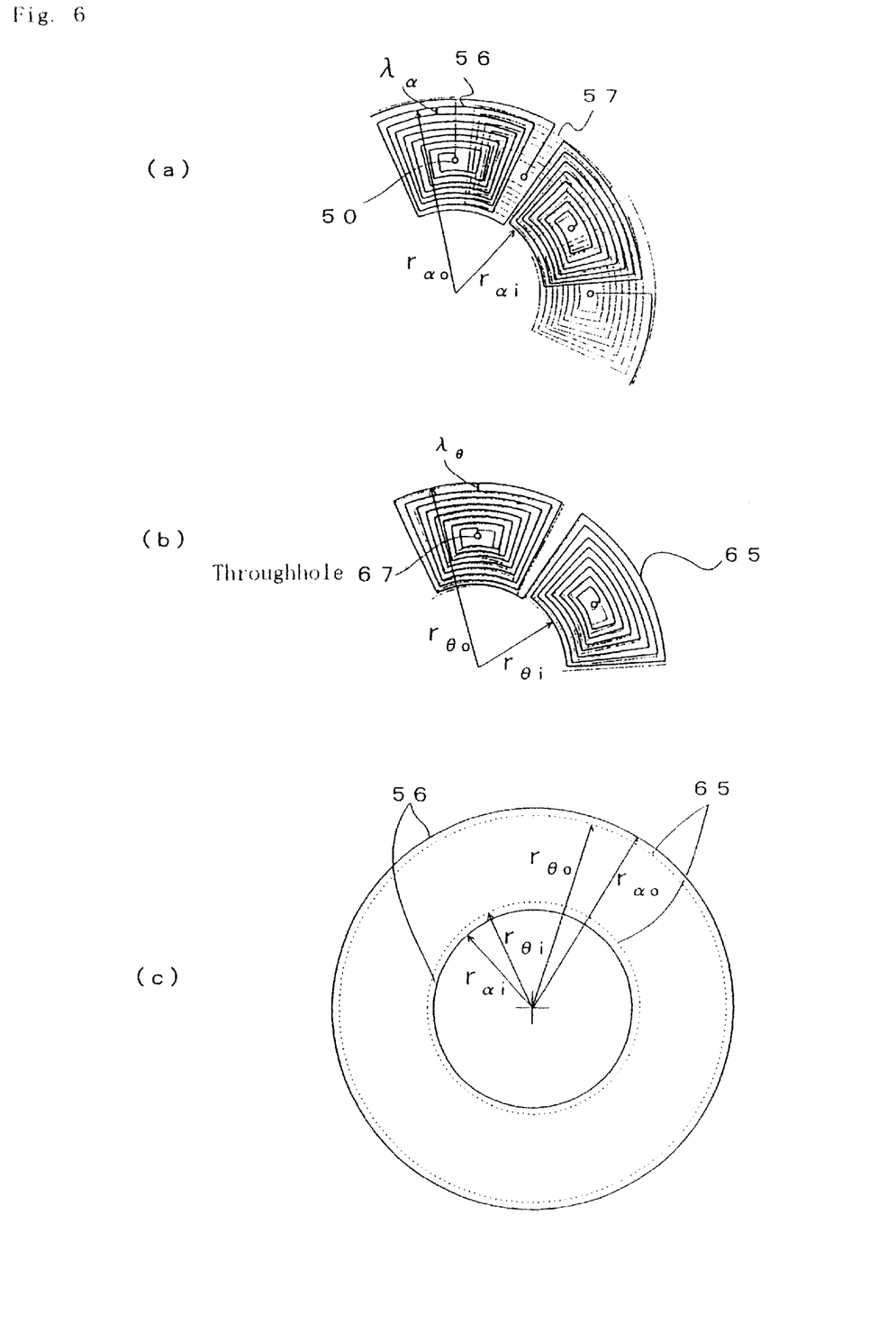
FIG. 6 shows patterns of the resolver using a sheet coil according to the third embodiment of the invention, which are, respectively, observed in the same direction, wherein (a) shows a resolver detection phase pattern, (b) shows a resolver excitation phase pattern, and in the drawing, solid lines indicate the pattern on the surface side of the sheet coil, and dotted lines indicate the pattern of the rear side, which is seen through the surface side, and (c) illustrates the profiles of the extremely outer diameter and extremely inner diameter of the respective patterns when the excitation phase of the resolver is opposed to the detection phase thereof.

FIG. 6 shows patterns of the resolver using a sheet coil according to the third embodiment of the present invention, which are, respectively, observed in the same direction, wherein (a) shows a resolver detection phase pattern, (b) shows a resolver excitation phase pattern, and in the drawing, solid lines indicate the pattern on the surface side of the sheet coil, and dotted lines indicate the pattern of the rear side, which is seen through the surface side, and (c) illustrates the profiles of the extremely outer diameter and extremely inner diameter of the respective patterns when the recitation phase of the resolver is opposed to the detection phase thereof. In the third embodiment, a description is based on a resolver having a pole logarithm of 3, which has an axial multiple angle of 3×, and is a single-phase excitation and two-phase detection type, and is further provided with an eddy pattern of 360° in terms of electric angle.

In these drawings, the third embodiment differs from the first embodiment in that the radius $r_{\theta o}$ of the extreme outer conductor of the detection phase pattern is larger than the radius $r_{\alpha 0}$ of the extremely outer conductor of the excitation phase, and the radius $r_{\alpha i}$ of the extremely inner conductor of the detection phase pattern is smaller than the radius $r_{\theta i}$ of the extremely inner conductor of the excitation phase pattern. A difference in radius between $r_{\alpha o}-r_{\theta i}$ and $r_{\theta i}-r_{\alpha i}$ is established to be $0<r_{\alpha o}-r_{\theta o} \leq 4\times\lambda_\alpha$ and $0<r_{\theta i}-r_{\alpha i} \leq 4\times\lambda_\alpha$ where the pattern pitch of the detection phase pattern is $\lambda_\alpha$.

Next, a description is given of the actions.

Figure 7:
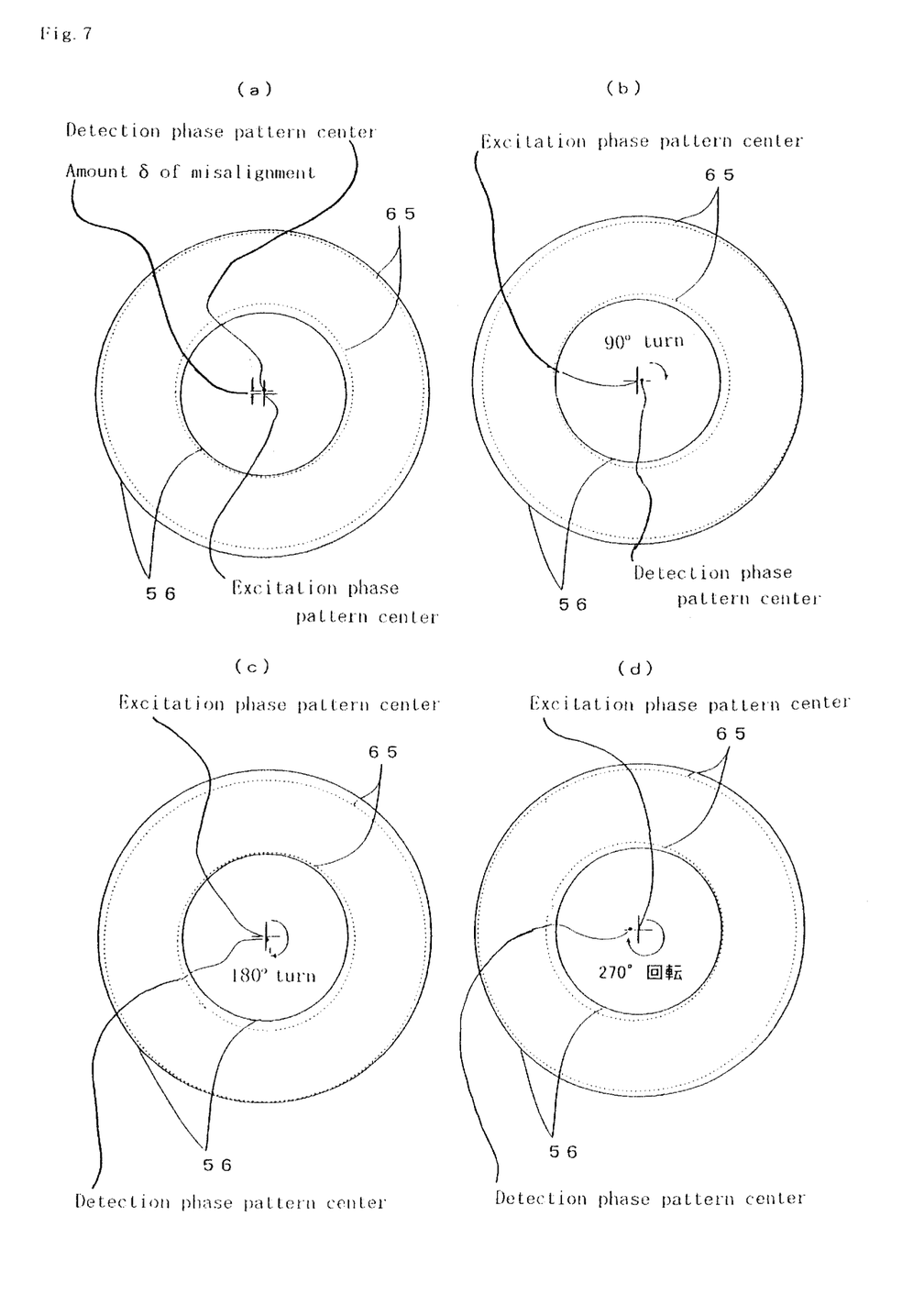
FIG. 7 is a view showing the profiles of the extremely outer diameter and extremely inner diameter of the resolver detection phase pattern and excitation phase pattern when the rotor misaligns with respect to the center of the stator, wherein (a) indicates a case where the rotor stands still, (b) indicates a case where the rotor turns by 90 degrees, (c) indicates a case where the rotor turns by 180 degrees, and (d) indicates a case where the rotor turns by 270 degrees.

FIG. 7 is a view showing the profiles of the extreme outer diameter and extreme inner diameter of the resolver detection phase pattern and excitation phase pattern when the rotor misaligns with respect to the center of the stator, wherein (a) indicates a case where the rotor stands still, (b) indicates a case where the rotor turns by 90 degrees, (c) indicates a case where the rotor turns by 180 degrees, and (d) indicates a case where the rotor turns by 270 degrees. In a resolver using a sheet coil, which is constructed as described above, if axial misalignment occurs when attaching a sheet coil, the rotor side sheet coil is subjected to axial misalignment with respect to the stator side sheet coil, and as shown in FIG. 7 (a) through (d), the resolver excitation phase pattern 65 turns on the resolver detection phase patterns 56 and 57. The extreme outer diameter of the excitation phase pattern 65 enters the extreme outer diameter of the detection phase patterns 56 and 57 without fail, wherein the extreme inner diameter of the excitation phase pattern 65 enters the extreme inner diameter of the detection phase patterns 56 and 57. Therefore, the variation in amplitude in flux linkage is decreased.

Figure 8:
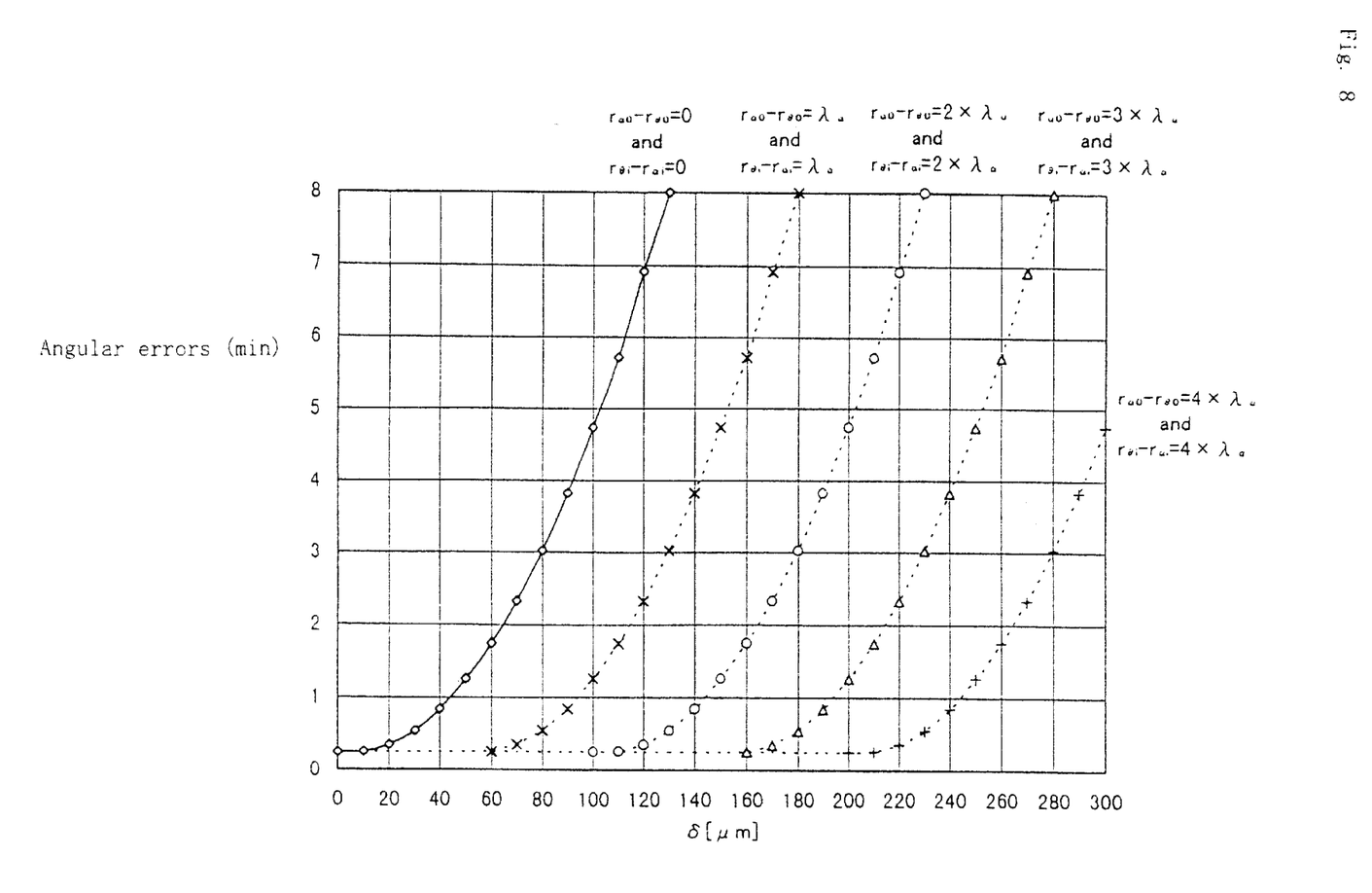
FIG. 8 is a view showing the relationship between the amount λ of misalignment and the angular error in the resolver using a sheet coil whose axial angle is 3× and outer diameter is 35 mm degrees.

Herein, FIG. 8 is a view showing the relationship between the amount δ of misalignment and the angular error in the resolver using a sheet coil whose axial multiple angle is 3×. This indicates angular errors at $r_{\alpha o}-r_{\theta o}=0$, $r_{\alpha o}-r_{\theta o}=\lambda_\alpha$, $r_{\alpha o}-r_{\theta o}=2\times\lambda_\alpha$, $r_{\alpha o}-r_{\theta o}=3\times\lambda_\alpha$ and $r_{\alpha o}-r_{\theta o}=4\times\lambda_\alpha$ at the minimum pattern pitch of 50 μm. As has been made clear in the drawings, in the case of prior arts ($r_{\alpha o}-r_{\theta o}=0$), the angular error was remarkably increased in line with an increase in the amount δ of misalignment. But, according to the invention, if $r_{\alpha o}-r_\theta=4\times\lambda_\alpha$ and $r_{\theta o}-r_{\alpha o}=4\times\lambda_\alpha$ are established, that is, the outside radius of the detection phase is made larger by four pitches than that of the excitation phase while the inside radius of the detection phase is made smaller by four pitches than that of the excitation phase even if the amount δ is 0.2 mm, the angular error remains as it is small. Also, if it is enough that, in the resolver of the axial multiple angle of 3×, the angular error is 5 degree or less, $r_{\alpha o}-r_{\theta o}=2\times\lambda_\alpha$ and $r_{\theta o}-r_{\alpha o}=2\times\lambda_\alpha$ are established, that is, the outside radius of the detection phase is made larger by two pitches than that of the excitation phase, and the inside radius of the detection phase is made smaller by two pitches.

In the above-described embodiment, because the sheet coil is increased in size, it seems that it becomes a shortcoming for the sake of downsizing. However, because the increase in size is ±0.2 mm at most, it does not constitute any problem in view of the entirety.

Also, although the number of turn times is increased to increase the patterns, there may remain a concern about increasing the loss as a result of an increase in resistance. However, an increase in the number of turns is four or less according to the present invention, wherein the ratio of a single eddy pattern to the number of turns is 5% at most. That is, the ratio is very slight in terms of the entire loss of the resolver, which does not constitute any problem.

Because the third embodiment according to the present invention is constructed as described above, as in the second embodiment, even if axial misalignment occurs when attaching a sheet coil, or the rotor is subjected to axial misalignment or a center slip, the variation in amplitude of the flux linkage is limited, and no angular error is increased.

In addition, in the first embodiment, although the thickness of the back yokes of the rotor or stator is determined to be adequate in FIG. 1, no problem is constituted even if the thickness of these back yokes is reduced to 2 through 3 mm because the flux produced by the rotary transformer pattern and resolver patterns are very small. Further, the flux that is produced by the patterns on both sides of the rotor does not interfere with each other due to the same reason.

Still further, the second and third embodiments relate to a case where, in the rotary transformer, the radius $r_2$ of the extreme outer conductor at the secondary side pattern is made larger than the radius $r_1$ of the extreme outer conductor of the primary side pattern and, in the resolver, the radius $r_{\alpha o}$ of the extreme outer conductor of the detection phase pattern is larger than the radius $r_{\theta o}$ of the extreme outer conductor of the excitation phase pattern while the radius $r_{\alpha i}$ of the extreme inner conductor of the detection phase pattern is smaller than the radius $r_{\theta i}$ of the extreme inner conductor of the excitation phase pattern. It is needless to say it is acceptable that the relationship in size between them is inverted. In addition, in the embodiments, the rotary transformer and resolver may be separately handled. However, there is no problem that they are constituted so as to be handled as a single sheet coil in which they are integrated with each other.

The above-described description was based on a case where the axial multiple angles are 2× and 3×. It is needless to say that other axial multiple angles may be used, wherein the same effects can be brought about.

INDUSTRIAL APPLICABILITY

The present invention pertains to a resolver that is used to detect the speed and position of a servomotor in the fields of factory automation equipment and office automation apparatuses, wherein the resolver can be downsized without resulting in a lowering of the detection voltage, and it is possible to limit the variation in amplitude of flux linkage even if axial misalignment occurs when attaching a sheet coil. Furthermore, the present invention may be applicable in providing of an inexpensive resolver using a sheet coil, which has only a small angular error.

What is claimed is:

1. A resolver including a disk-shaped rotor and two disk-shaped stators between which said rotor is placed with air gaps in the axial direction thereof, wherein said rotor is such that a rotor side sheet coil is attached to both sides of a disk-shaped soft magnetic material on which are formed a secondary side pattern of a rotary transformer and a resolver excitation phase pattern, and a stator side sheet coil having a rotary transformer primary side pattern formed on a disk-shaped soft magnetic material is attached to one of said stators opposed to said rotary transformer secondary pattern, and a stator side sheet coil having a resolver detection phase pattern formed on a disk-shaped soft magnetic material is attached to the other of said stators opposed to said resolver excitation phase pattern, wherein said stator side sheet coil is formed of a single sheet composed of a disk having said resolver detection phase pattern formed, a disk having said rotary transformer primary side pattern formed, and a linear portion that links the corresponding two disks with each other.

2. The resolver using a sheet coil as set forth in claim 1, wherein the rotor side sheet coil is formed of a single sheet composed of a disk having said resolver excitation phase pattern formed, a disk having said rotary transformer secondary side pattern formed, and a linear portion having a cross-over line that connects said resolver excitation phase pattern and said rotary transformer secondary side pattern to each other.

3. The resolver using a sheet coil as set forth in claim 1 or 2, wherein said rotary transformer secondary side pattern formed on both sides of the disk is a pattern eddy from outside to inside, and both the patterns are connected to each other in series, and said resolver excitation phase pattern that is formed at both sides of the disk is a pattern eddying by 2N times in the circumferential direction, where N is a natural number, and the center of the eddy pattern on the surface side is disposed at the same position of the eddy pattern on the rear side in the circumferential direction, and 4N eddy patterns are connected to each other in series, wherein the axial multiple angle is NX, where NX means the resolver has a pole logarithm of N.

4. The resolver using a sheet coil as set forth in claim 1, wherein said rotary transformer primary side pattern is formed on both sides of the disk, and both patterns eddying from outside to inside are connected to each other in series, and said resolver detection phase pattern is formed on both sides of the disk, and one side of which is an "α" and the other of which is a "β" phase, wherein 2N patterns eddying in the circumferential direction are disposed, wherein N is a natural number, and the center positions of the eddy portions of the "α" phase and the "β" phase slip by 90/N° from each other in the circumferential direction, and 2N eddy patterns are connected to each other in series to cause the axial multiple angle to become NX, where NX means the resolver has a pole logarithm of N.

5. The resolver using a sheet coil as set forth in claim 1 or claim 2, wherein one of either the outer diameter of said rotary transformer secondary side pattern or that of said rotary transformer primary side pattern is made larger than the other thereof.

6. The resolver using a sheet coil as set forth in claim 1 or claim 2, wherein the radius $r_2$ of the extremely outer conductor of said rotary transformer secondary side pattern and radius $r_1$ of the extremely outer conductor of said rotary transformer primary side pattern is established so as $0 < r_2 - r_1 \leq 4 \times \lambda_2$ or $0 < r_1 - r_2 \leq 4 \times \lambda_1$ where the pattern pitch of the rotary transformer secondary side pattern is $\lambda_2$ and the pattern pitch of the rotary transformer primary side pattern is $\lambda_1$.

7. The resolver using a sheet coil as set forth in claim 1 or claim 2, wherein the outer diameter of said resolver excitation phase pattern is made larger than the outer diameter of the resolver detection phase pattern while the inner diameter of the resolver excitation phase pattern is made smaller than the inner diameter of the resolver detection phase pattern, or the outer diameter of the above-described detection phase pattern is made larger than the outer diameter of the above-described excitation phase pattern while the inner diameter of the detection phase pattern is made smaller than the inner diameter of the excitation phase pattern.

8. The resolver using a sheet coil as set forth in claim 1 or claim 2, wherein, where the pattern pitch of the resolver detection phase pattern is $\lambda_\theta$, and the pattern pitch of the solver detection phase pattern is $\lambda_\alpha$, the radious $r_{\theta o}$ of the extremely outer conductor of the resolver excitation phase pattern and the radious $r_{\alpha o}$ of the extremely outer conductor of the rotary transformer primary side pattern, or the radius $r_{\theta 1}$ of the extremely inner conductor of the resolver excitation phase pattern and the radius $r_{\alpha 1}$ of the extremely inner conductor of the rotary transformer primary side pattern are established so as to become $$0 < r_{\alpha o} - r_{\theta o} \leq 4 \times \lambda_\alpha$$

and $$0 < r_{\theta i} - r_{\alpha i} \leq 4 \times \lambda_\alpha$$

or $$0 < r_{\theta o} - r_{\alpha o} \leq 4 \times \lambda_\theta$$

and $$0 < r_{\alpha i} - r_{\theta i} \leq 4 \times \lambda_\theta.$$

* * * * *